United States Patent

Thomsen et al.

Patent Number: 5,294,097
Date of Patent: Mar. 15, 1994

[54] APPARATUS FOR MOUNTING A SPIRAL SPRING

[75] Inventors: H. Jay Thomsen, Detroit; William D. Belisle, Canton; Christopher J. Walter, Ann Arbor, all of Mich.

[73] Assignee: Hasco Industries, Inc., Southfield, Mich.

[21] Appl. No.: 914,207

[22] Filed: Jul. 14, 1992

[51] Int. Cl.⁵ .............................................. F16F 1/10
[52] U.S. Cl. ........................................ 267/156; 185/45
[58] Field of Search ............... 267/155, 156, 157, 182, 267/275; 185/45; 242/107

[56] References Cited

U.S. PATENT DOCUMENTS

| | | | |
|---|---|---|---|
| 3,091,447 | 5/1963 | Donkin | 267/156 |
| 3,151,704 | 10/1964 | Clarke | 267/156 X |
| 3,550,928 | 12/1970 | Antritter | 267/156 |
| 3,886,374 | 5/1975 | Lefeuvre | 267/156 X |
| 4,103,765 | 8/1978 | Tinholt | 267/156 X |
| 4,635,755 | 1/1987 | Arechaga | 267/156 X |
| 4,719,992 | 1/1988 | Elward et al. | 267/156 X |
| 4,793,444 | 12/1988 | Nagano | 267/155 X |
| 4,921,230 | 5/1990 | Thomsen | 267/156 |

FOREIGN PATENT DOCUMENTS 0014634  2/1981  Japan ..................................... 267/155

Primary Examiner—Robert J. Oberleitner
Assistant Examiner—Peter M. Poon
Attorney, Agent, or Firm—Harness, Dickey & Pierce

[57] ABSTRACT

There is provided a two point mounting system for the outside end of a spiral spring. The mounting system induces a torsional load on the outside end of the spiral spring to overcome the tendency of the spiral spring coils to move into a non-concentric position. The mounting system comprises a single piece sleeve which has an elongated slot for contacting the spiral spring on opposite sides and inducing the torsional load.

9 Claims, 2 Drawing Sheets

APPARATUS FOR MOUNTING A SPIRAL SPRING

FIELD OF THE INVENTION

The present invention relates to a two point mounting system. More particularly, the present invention relates to a two point mounting system for a spiral spring which positions the spirally wound spring such that significant adjacent coil contact is eliminated.

BACKGROUND OF THE INVENTION

This invention is directed towards a two point system for mounting a spiral spring. While the term spiral spring will be used to describe the present invention, it is understood that the term spiral spring includes springs of similar designs which are sometimes termed clock wound springs or power springs. Normally, spiral springs are manufactured from a series of windings of a flat piece of spring wire material. Most of these springs have multiple coils generally having unrolled lengths of between 10 and 50 inches depending on the requirements of the particular application. Typical applications for these springs are counter-balances for vehicle windows, vehicle hoods or vehicle trunk lids.

When spiral springs are loaded, the coils are forced to one side causing adjacent coils to come into contact and position the spiral spring in a non-concentric position as illustrated in FIG. 1. In the non-concentric position, the contact of the coils creates a source of adjacent coil friction. This load in the coils caused by this adjacent coil friction will continue to build up as the spiral spring is wound until the load on the coils exceeds the frictional force holding the coils in contact with each other. The adjacent coils will then jump to a new position in contact with each other and the process will begin again. The continued build up of load and sudden release of the adjacent coils will have a chattering affect of the coils. The chattering of the coils can create an objectionable noise that will occur every time a trunk lid, a window or a hood is cycled.

Most of today's applications of spiral springs require some form of rust preventative coating. Because of the adjacent coil contact of the spiral spring in a loaded condition, applying the rust preventative after the assembly of the spring is not a viable option. Therefore, the rust preventative must be applied to the spring in an unloaded condition thus eliminating the opportunity of applying the rust preventative along with the mating components in an assembled condition.

Various attempts have been made at reducing or eliminating this adjacent coil friction build up. One method of reducing the amount of friction is to lubricate the coils prior to loading when the coils are in a concentric arrangement. This has the effect of lowering the coefficient of friction between adjacent coils and thus the load at which the adjacent coils will slip. The problems associated with lubrication of the coils is that it is a costly operation, and the lubricant will eventually be removed or squeezed out from in between the coils without the opportunity of having it replaced. The spiral spring is then operating as a non-lubricated spring with the associated chattering and noise problems.

U.S. Pat. No. 4,921,230 issued May 1, 1990 to H. Jay Thomsen discloses a method of eliminating adjacent coil contact and maintaining concentric coils of a spiral spring in a loaded condition. Thomsen discloses a clip which is part of the mounting of the spiral spring. The outer coil of the spring rides against the clip, the clip then stopping the movement of the spiral spring to a non-concentric position. While the retention clip in Thomsen works satisfactorily, it requires an additional piece and the orientation of the clip with respect to the spring must be maintained during the operation of the mechanism.

U.S. Pat. No. 3,091,447 issued May 28, 1963 to A. W. Donkin discloses another method of eliminating adjacent coil contact. Donkin uses a spring which is wound in an initial non-concentric form. The non-concentrically wound spring is used in conjunction with a two contact point staking arrangement. When load is applied to the spring, the spring has the tendency to move from its original non-concentric shape into a shape where the coils are concentric. The two contact point staking arrangement is either a two pin mounting system or an elongated bar contacting the spring at two points on the same side of the spring. The requirement of using a spiral spring having non-concentric adjacent coils presents both manufacturing problems and higher costs.

Accordingly, what is needed is a mounting system for a standard spiral spring which is simple, low cost and is able to maintain the concentric shape of the spiral spring after the spring is loaded and during the operation of the mechanism to which the spring is attached.

SUMMARY OF THE INVENTION

The present invention discloses a two point mounting system for a spiral spring's outside end which induces a torsional load on the spring to overcome the tendency of the spiral spring coils to move into a non-concentric position. The mounting system is a single piece sleeve which has an elongated slot for contacting the spiral spring on the opposite sides and inducing the torsional load. By maintaining the spring coils in an approximate concentric position, the adjacent coil contact is reduced if not eliminated. The need for lubricating the spring is eliminated as well as the need to provide a rust preventative in an unloaded condition. Because of the non-contacting coils, the spring can be coated with a rust preventative in the loaded or assembled condition along with the mechanism with which it is assembled. This elimination of a pre-assembled rust preventative in conjunction with an elimination of lubrication significantly reduces the cost of the spring. In addition to the advantages mentioned above, the elimination of the adjacent coil contact eliminates side loading of the pin which mounts the internal end of the spring. This reduction or elimination of side loading of the center pin in will significantly increase the life of the assembly.

BRIEF DESCRIPTION OF THE DRAWINGS

Further objects, features and advantages of the present invention will become apparent from the analysis of the following written specification, the appended claims and the accompanying drawings in which:

DETAILED DESCRIPTION OF THE PREFERRED EMBODIMENT

Figure 1:
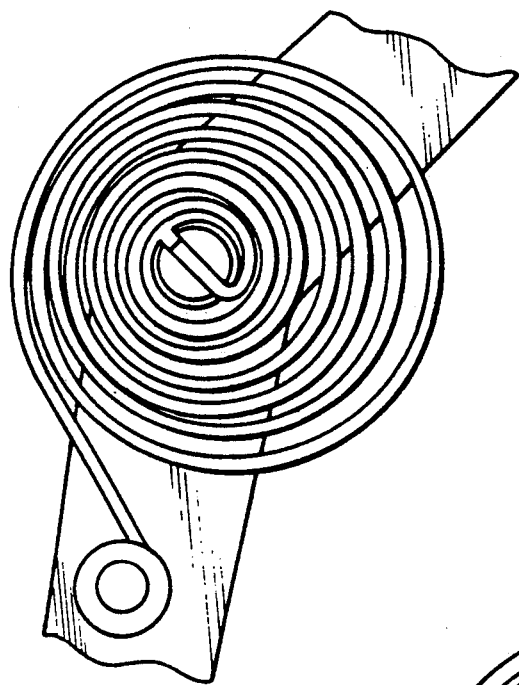
FIG. 1 is a front elevational view of a spiral spring in accordance with prior art teachings.
Figure 3:
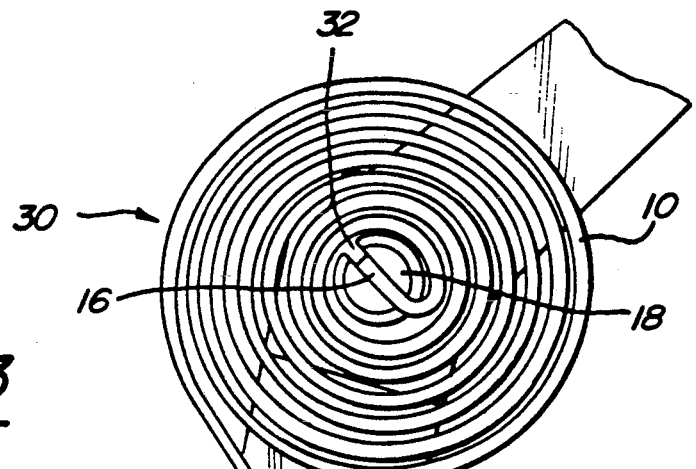
FIG. 3 is a front elevational view of a spiral spring in accordance with the present invention.
Figure 2:
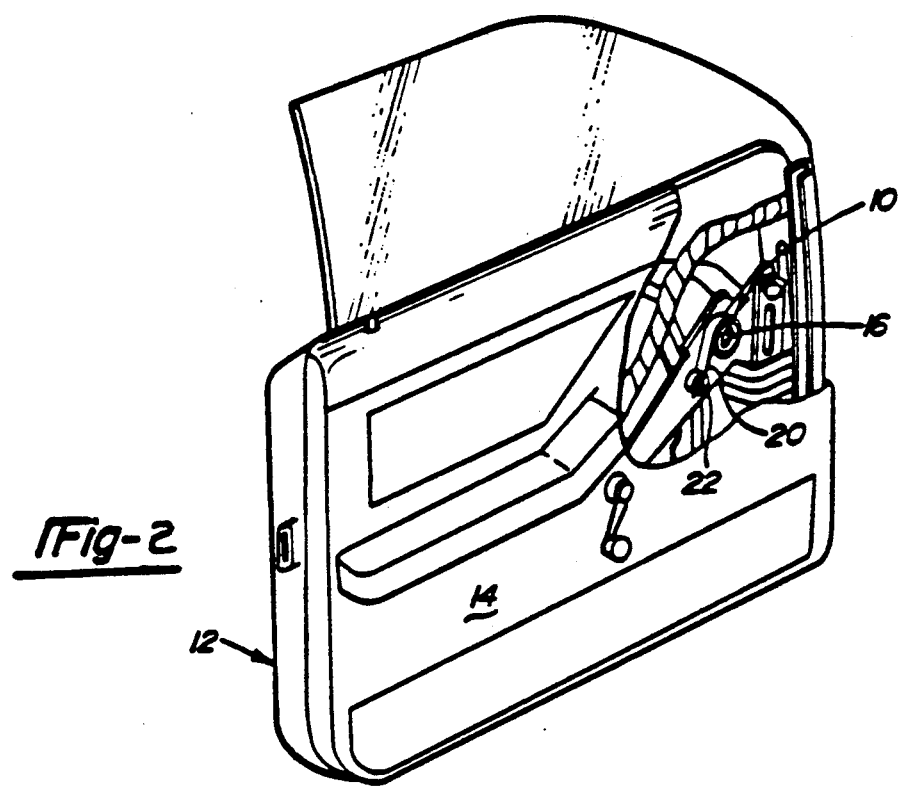
FIG. 2 is a perspective view partially in cross-section of a vehicle door including a spiral spring mounted in accordance with the present invention.

Turning to the figures, particularly FIGS. 2 and 3, the spiral spring mounting system of the present invention is illustrated with a spiral coil spring 10. The spiral coil spring 10 may be used as a counter balance or the like in a vehicle window system. Generally, the spring is positioned within a door 12 and is concealed from view by door panel 14. The spring 10 is secured to a support at its inner end 16 at the center of the coils by an arbor 18. The outer end 20 of the spring 10 is secured by a sleeve 22 to a second support. Thus, the spring coils and uncoils in response to the movement of a window or the like to provide counter balancing characteristics.

Figure 4:
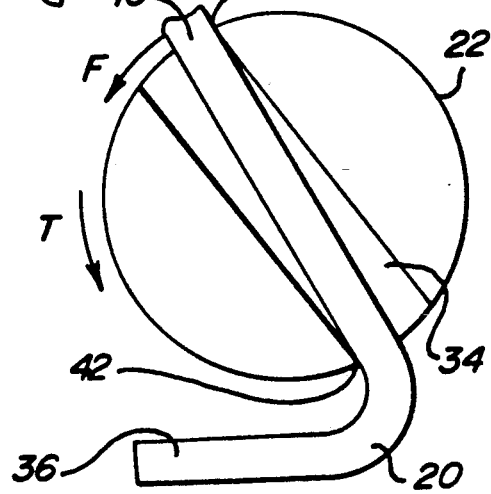
FIG. 4 is an enlarged view of the two point mounting system for the outside end of the spiral spring in accordance with the present invention.

Referring now to FIGS. 3 and 4, a two point spiral spring mounting system of the present invention is shown and is designated by the reference numeral 30. Mounting system 30 comprises the spiral spring 10, the inside arbor 18 and the outside sleeve 22. When mounting system 30 is located on a mechanism, normally inside arbor 18 will be able to rotate relative to outside sleeve 22, thus loading spiral spring 10. This relative motion between inside arbor 18 and the outside sleeve 22 acts to wind and unwind spiral spring 10.

Spiral spring 10 is secured to inside arbor 18 at its inner end 16. Inner end 16 is located at the center of the coils of spring 10 and is disposed in an elongated slot 32 extending a portion of the way into inner arbor 18. The outer end 20 of spiral spring 10 is secured to outside sleeve 22. Outer end 20 is disposed in an elongated slot 34 extending a portion of the way into outer sleeve 22. Outer end 20 is formed with a hook 36 which wraps around outer sleeve 22 and prohibits spiral spring 10 from slipping out of slot 34.

Figure 5:
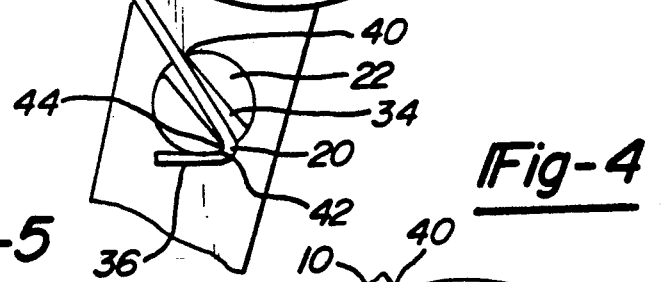
FIG. 5 is an enlarged view of the two point mounting system for the outside end of the spiral spring in accordance with another embodiment of the present invention.
Figure 5:
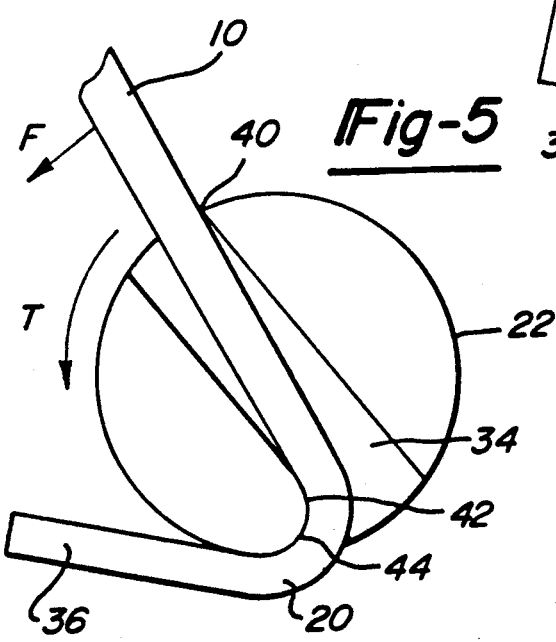

Elongated slot 34 is positioned such that when spiral spring 10 is located in elongated slots 32 and 34 and a torsional load is applied to spiral spring 10, which is in a direction to further wind spring 10, longitudinal slot 34 of outer sleeve 22 contacts outer end 20 of spiral spring 10 at two points 40 and 42 on opposite sides of spiral spring 10 as shown in FIG. 4. This two point contact on opposite sides of spiral spring 10 by outer sleeve 22 induces a torsional load shown by arrow T in FIG. 4 which forces the outer coil of spring 10 in an outward direction as shown by arrow F in FIG. 4. The amount of torsional load can be varied by changing the relative position of elongated slot 34 relative to the inner arbor 18. The reaction of spiral spring 10 to this torsional load applied at outer end 20 is to overcome the tendency of the coils to move to a non-concentric position and thus maintain spiral spring 10 in an open coil or concentric coil position. By maintaining spiral spring 10 in an open coil or concentric coil position, the side loading on inside arbor 18 is significantly reduced or even eliminated thus providing a substantial increase in the life of the assembly. Elongated slot 34 can be provided with a radiused corner 44 as shown in FIG. 5 which is designed to engage the hook 36 formed into the outer end 20 of spiral spring 10.

While the above detailed description describes the preferred embodiment of the present invention, it should be understood that the present invention is susceptible to modification, variation and alteration without deviating from the scope and fair meaning of the subjoined claims.

What is claimed is:

1. A spiral spring assembly comprising:
   a spiral spring having a plurality of convolutions all of which are generally concentric with one another when said spiral spring is unloaded; said spiral spring having an inside end located within said plurality of convolutions and an outside end located outside of said plurality of convolutions;
   a rotatable shaft engaged with said inside end of said spiral spring; and
   a fixed, non-rotatable sleeve engaged with said outside end of said spiral spring such that said fixed sleeve contacts said outside end of said spiral spring at two points, each point located on opposite sides of said outside end of said spiral spring, said two point contact inducing a torque to maintain said plurality of convolutions generally concentric with one another when said spiral spring is wound by rotation of said rotatable shaft.

2. The apparatus of claim 1 wherein said rotatable shaft has a longitudinal slot therein, said spiral spring having an inner coil provided with said inside end bent at an angle relative to said inner coil and being received in said longitudinal slot to interconnect said spiral spring to said rotatable shaft.

3. The apparatus of claim 1 wherein said fixed sleeve has an elongated slot, therein said outside end of said spiral spring being disposed in said elongated slot and contacting said fixed sleeve on opposite sides of said slot.

4. The apparatus of claim 3 wherein said outside end of said spiral spring forms a hook for engagement with said fixed sleeve.

5. The apparatus of claim 4 wherein one end of said elongated slot conforms to the shape of said hook.

6. A spiral spring assembly comprising:
   a spiral spring having a plurality of convolutions all of which are generally concentric with one another when said spiral spring is unloaded; said spiral spring having an inside end located within said plurality of convolutions and an outside end located outside of said plurality of convolutions;
   a rotatable shaft having a longitudinal slot therein, said spiral spring having an inner coil provided with said inside end bent at an angle relative to said inner coil and being received in said longitudinal slot to interconnect said spiral spring to said rotatable shaft; and
   a fixed, non-rotatable sleeve having an elongated slot therein; said outside end of said spiral spring being disposed in said elongated slot and contacting said fixed sleeve at two points, each point of said two points being located on opposite sides of said outside end of said spiral spring, said two point contact inducing a torque to maintain said plurality of convolutions generally concentric with one another when said spiral spring is wound by rotation of said rotatable shaft.

7. The apparatus of claim 6 wherein said outside end of said spiral spring forms a hook for engagement with said fixed sleeve.

8. The apparatus of claim 7 wherein one end of said elongated slot conforms to the shape of said hook.

9. A spiral spring assembly comprising:

a spiral spring having a plurality of convolutions all of which are generally concentric with one another when said spiral spring is unloaded; said spiral spring having an inside end located within said plurality of convolutions and an outside end located outside of said plurality of convolutions;

a rotatable shaft having a longitudinal slot therein, said spiral spring having an inner coil provided with said inside end bent at an angle relative to said inner coil and being received in said longitudinal slot to interconnect said spiral spring to said rotatable shaft; and a fixed, non-rotatable sleeve having an elongated slot therein, said elongated slot conforming to the shape of said outside end of said spiral spring, said outside end of said spiral spring being disposed in said elongated slot and contacting said fixed sleeve at two points, each point of said two points being located on opposite sides of said outside end of said spiral spring, said two point contact inducing a torque to maintain said plurality of convolutions generally concentric with one another when said spiral spring is wound by rotation of said rotatable shaft.

* * * * *